(12) United States Patent
Ehrhart et al.

(10) Patent No.: US 10,615,591 B2
(45) Date of Patent: Apr. 7, 2020

(54) POWER ELECTRONICS UNIT (71) Applicant: L-3 COMMUNICATIONS MAGNET-MOTOR GMBH, Starnberg (DE)

(72) Inventors: Peter Ehrhart, Starnberg (DE); Jens Steffen, Starnberg (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 0 days.

(21) Appl. No.: 16/062,605

(22) PCT Filed: Dec. 16, 2015

(86) PCT No.: PCT/EP2015/080030
§ 371 (c)(1),
(2) Date: Jun. 14, 2018

(87) PCT Pub. No.: WO2017/101996
PCT Pub. Date: Jun. 22, 2017

(65) Prior Publication Data
US 2018/0375321 A1    Dec. 27, 2018

(51) Int. Cl.
*H02H 7/09* (2006.01)
*H02P 29/40* (2016.01)
(Continued)

(52) U.S. Cl.
CPC ............ *H02H 7/09* (2013.01); *H02H 7/0838* (2013.01); *H02H 7/1227* (2013.01); *H02M 1/32* (2013.01);
(Continued)

(58) Field of Classification Search
CPC . H02H 7/09; H02P 29/10; H02P 29/40; H02P 6/182
(Continued)

(56) References Cited

U.S. PATENT DOCUMENTS

2006/0006832 A1\* 1/2006 Kitajima ................. B60K 6/26
318/800
2006/0181239 A1\* 8/2006 Galli ....................... D06F 37/42
318/805

(Continued)

FOREIGN PATENT DOCUMENTS

EP    0742637 A1    11/1996
EP    0970840 A2    1/2000
(Continued)

*Primary Examiner* — Eduardo Colon Santana
*Assistant Examiner* — Gabriel Agared
(74) *Attorney, Agent, or Firm* — Seed Intellectual Property Law Group LLP (57) ABSTRACT

A power electronics unit for driving an electric machine excited by permanent magnets and including a rotor and a stator having at least one stator winding, comprising at least one power switch designed to drive the stator winding, and an overvoltage protection device to protect the power switch from overvoltage. The overvoltage protection device comprises a phase voltage detecting device associated with the power switch as well as a short-circuit switching circuit which, when a predetermined phase voltage threshold value of the phase voltage detected by the phase voltage detection device is reached or exceeded, is adapted to be activated for short-circuiting the stator winding associated with the power switch. The short-circuit switching circuit comprises the power switch designed to drive the stator winding.

20 Claims, 3 Drawing Sheets

(51) Int. Cl.
  *H02M 1/32*    (2007.01)
  *H02H 7/08*    (2006.01)
  *H02H 7/122*   (2006.01)
  *H02P 6/182*   (2016.01)
  *H02P 29/10*   (2016.01)
(52) U.S. Cl.
  CPC .............. *H02P 6/182* (2013.01); *H02P 29/10*
             (2016.02); *H02P 29/40* (2016.02)
(58) Field of Classification Search
  USPC .................................................. 318/400.22
  See application file for complete search history.

(56) References Cited

U.S. PATENT DOCUMENTS

| | | | | |
|---|---|---|---|---|
| 2010/0134057 A1* | 6/2010 | Focking | ............... | H02H 7/0838 |
| | | | | 318/400.22 |
| 2012/0019178 A1* | 1/2012 | Kono | ........................ | B60L 3/04 |
| | | | | 318/400.3 |
| 2013/0181645 A1* | 7/2013 | Kopken | .................... | H02P 3/22 |
| | | | | 318/400.22 |
| 2015/0162816 A1* | 6/2015 | Herrmann | .................. | H02J 3/36 |
| | | | | 307/35 |

FOREIGN PATENT DOCUMENTS

| | | |
|---|---|---|
| EP | 0974483 A2 | 1/2000 |
| WO | 2008122602 A1 | 10/2008 |

\* cited by examiner

POWER ELECTRONICS UNIT

BACKGROUND

Technical Field

The present invention relates to a power electronics unit for driving an electric machine excited by permanent magnets and including a rotor and a stator having at least one stator winding. The power electronics unit comprises at least one power switch designed to drive the stator winding, and an overvoltage protection device for protecting the power switch from overvoltage.

Description of the Related Art

The EMF of machines excited by permanent magnets, i.e., motors and/or generators, has a substantially linear course with the speed of the rotor carrying the magnets. In prior art designs, the maximum EMF is achieved at the maximum speed of the rotor. With the maximum possible phase current of the power electronics system associated with the electric machine, the in theory maximum achievable base power of the machine is thus established by the maximum torque at the upper left point of the power hyperbola and the maximum speed. However, higher speeds can be achieved when the phase angle of the counter voltage impressed by the power electronics system and thus the effective phase current is altered relative to the EMF of the rotor and the machine is operated in a field weakening mode, as it is known especially in electric machines with excitation windings. In case of a machine excited by permanent magnets, the EMF which is effective in the direction of the power electronics system, in case of a field weakening mode of operation, is lowered by the inductive voltage drop in the machine during current flow, and the maximum permissible voltage acting on the power electronics system is reached only at higher rotational speeds. However, this method requires protection mechanisms against sudden failure of the reactive current component, because the inductive voltage drop is not present in this case and the "unmanipulated" EMF is present at the power electronics system. If this occurs in speed ranges where the EMF is higher than the maximum allowable value for the power electronics system, damage to the power electronics system up to partial destruction of the same may result.

EP 0 970 840 and EP 0 974 483 show a protection device against voltage kickback or retroactive voltages in a permanent magnet drive, which is operated in a field weakening mode. The protection device is connected, between an inverter driving the motor and the motor, to the power phases and has a three-phase diode bridge, which has a thyristor connected to its output and a voltage protection electronics system connected in parallel thereto. The protection against excessively high terminal voltages between motor and drive control takes place by igniting the thyristor and the thus resulting short-circuit of all motor terminals via the three-phase diode bridge. The on-resistance of diode bridge and thyristor acts as a braking load in this arrangement.

EP 0 742 637 shows an emergency braking arrangement for realizing an integrated armature short-circuit for an electrical three-phase drive controlled via an inverter for safe braking of the drive in case of a fault that is not described in more detail. For effecting emergency braking in the event of a fault, the control system offers a possibility of bringing about an integrated armature short-circuit by blocking one inverter bridge of the inverter in safe technology, driving the other inverter bridge by clocking driving pulses to cause a short-circuit of the phases of the electric drive. The timing of the clocked driving pulses is selected such that the short-circuit current induced by the armature movement in the armature windings generates an optimum braking moment for the armature.

BRIEF SUMMARY

It is the object of the present invention to make available an alternative and, in terms of circuit technology, simpler protection device against voltage kickback or retroactive voltages in a permanent magnet electric machine, which is designed in particular for operation of the electric machine in the field weakening mode.

According to the invention, there is suggested a power electronics unit for driving a permanent magnet electric machine including a rotor and a stator having at least one stator winding, said unit comprising the following features: the power electronics unit comprises at least one power switch designed to drive the stator winding, and an overvoltage protection device for protecting the power switch from overvoltage. The overvoltage protection device comprises a phase voltage detecting device associated with the power switch, as well as a short-circuit switching circuit which, when a predetermined phase voltage threshold value of the phase voltage detected by the phase voltage detecting device is reached or exceeded, is adapted to be activated for short-circuiting the stator winding associated with the power switch. The short-circuit switching device comprises the power switch configured for driving the stator winding.

The short-circuit switching circuit is configured to short-circuit the stator winding associated with the power switch when the phase voltage detected by the phase voltage detecting device reaches or exceeds a predetermined phase voltage threshold value.

By activation of the short-circuit switching device, the overvoltage protection device reduces the voltage applied to the power switch in case of failure of the reactive current to an acceptable level. The activation of the short-circuit switching circuit takes place when the phase voltage detected by the phase voltage detecting device exceeds a threshold value associated with the respective power switch. According to the invention, the voltage applied to the power switch in case of failure of the reactive current can be effected by short-circuiting the stator winding associated with the power switch, for example, via a potential bus connected to the power switch. This creates a short-circuit current in the stator winding, which is driven by the voltage induced by the rotor movement. The short-circuit current flows across the power switch, however without significant voltage drop at the power switch. In particular, the short-circuiting can be effected such that the short-circuit current substantially has only an inductive reactive current component, but no significant—or at least no relevant—ohmic active component, so that the movement of the rotor is only slightly slowed down by the activation of the short-circuit switching circuit. The activation of the short-circuit switching circuit is to be effected especially at high rotor speed. It may be favorable to keep the short-circuit switching circuit permanently activated after activation, in any case for a period of time which is sufficiently long in comparison with the number of revolutions of the rotor. In other words, it may be provided in particular to activate the short-circuit switches with a frequency that differs significantly from the rotational speed of the electric machine, in particular is significantly smaller than the pole changing frequency of the electric machine.

The design of the current-carrying capability of the short-circuit switches can be implemented in accordance with the maximum short-circuit current of the electric machine connected thereto, which, in case of tripping, has to be carried by the short-circuit switch. The effect utilized in this regard is that permanent magnet machines (i.e., motors and/or generators excited by permanent magnets), in the short-circuited state, carry a current approximately equal to the maximum operating current.

Specific embodiments of the present invention may comprise one or more of the following optional features. These can be implemented individually, but also in combination with one another, unless explicitly stated otherwise:

In particular, the power switch may form a short-circuit switching element of the short-circuit switching circuit that is associated with the stator winding, and the short-circuit switching circuit may be designed such that it switches the power switch to a conducting state in order to short-circuit the stator winding associated with the power switch.

In particular, the power switch may be designed as a switching component of an inverter bridge for driving the stator winding. For example, an inverter for driving an electric machine may comprise an inverter bridge, comprising two power switches each of a first and a second bridge. Each phase of the electric machine then may have a short-circuit switching circuit of its own associated therewith, which is constituted by two power switches of the first and second bridges each. The power switches in the first or second bridge branch then may be short-circuited in response to an overvoltage, for protecting the inverter from overvoltage.

In many cases, the power electronics unit may comprise a DC voltage intermediate circuit with a first pole (e.g., plus pole) and a second pole (e.g., negative pole). The input of the at least one power switch then will be connected to one of the poles of the DC voltage intermediate circuit.

The power electronics unit may comprise a multi-phase inverter bridge for driving a stator provided with a plurality of stator windings. For example, three-phase inverter bridges are common for driving a stator provided with three stator windings. In principle, however, the power electronics unit can also be designed for more than three phases and even for single-phase machines in which only one stator winding and accordingly only one power switch each for the plus pole of the DC voltage intermediate circuit and one switch each for the negative pole of the DC voltage intermediate circuit are provided.

In case of an electric machine in delta connection configuration, each phase has a short-circuit switching circuit of its own associated therewith, which is constituted by two power switches each that are closed in the event of a short-circuit. In the event of a short-circuit, two power switches are closed then, which are connected to the same pole of the DC voltage intermediate circuit. The power switches connected to the other pole of the DC voltage intermediate circuit are open. The circuit in which the short-circuit current flows thus is at the same potential as the DC voltage intermediate circuit. A similar arrangement can also be realized in case of an electric machine in star connection configuration, with the provision that, in case of two closed power switches in case of a short-circuit, two juxtaposed stator windings are short-circuited.

The short-circuit switching circuit, in particular, may be designed such that it keeps the power switch, after activation for generating a short-circuit of the associated stator winding, in the conducting state until the short-circuit switching circuit is deactivated. The corresponding stator winding, upon activation of the short-circuit switching circuit, then is permanently short-circuited until deactivation of the same. It has shown that in case of permanent magnet synchronous machines, the stator windings in many cases have such an inductance that, when the stator winding is completely short-circuited from the activation of the short-circuit switching circuit until deactivation of the same, there is induced a voltage whose active component is relatively low. For this reason, the activation of the short-circuit switching circuit does not lead to a noticeable braking effect for the rotor of the electric machine.

In order to avoid an excessive braking effect upon activation of the short-circuit switching circuit, it may be provided in particular that the short-circuit switching circuit is designed such that it switches the power switch to the conducting state for generating a short-circuit of the associated stator winding only when the speed of the rotor reaches, or exceeds, a predetermined minimum speed. At lower speeds, an inadmissibly high overvoltage is normally not to be expected. Thus, it is possible to deactivate the short-circuit switching circuit as long as a minimum speed is not reached or exceeded. The minimum speed may be chosen such that the coil voltage induced by the rotor in accordance with the rotational speed is below the voltage strength of the components arranged in the power circuit. In particular, the minimum speed may be 1000 min$^{-1}$ and sometimes even 1500 min$^{-1}$ and even 2000 min$^{-1}$.

It may also be provided to permit activation of the short-circuit switching circuit only in certain modes of operation of the electric machine, for example, by designing the short-circuit switching circuit such that it effects a switching of the power switch for generating a short-circuit of the associated stator winding only when the electric machine is operating in a field weakening mode. In case of a permanent magnet electric machine, the field weakening is achieved in that the phase angle of the countervoltage imparted by the power electronics system and thus the effective phase current is altered with respect to the EMF of the rotor. As a result, there is created an opposing field emanating from the stator windings, which partially displaces the exciting field generated by the permanent magnets of the rotor. In the field weakening mode, there can be achieved higher speeds than the maximum speed set by the maximum voltage carrying capacity of the electronic components in case of proportionality of speed and induced voltage, as the EMF acting in the direction of the power electronics system is lowered by the inductive voltage drop in the machine in case of current flow and the maximum admissible voltage effective at the power electronics system is applied in case of higher speeds only.

The short-circuit switching circuit may comprise an evaluation logic for controlling and/or driving the short-circuit switching circuit. Activation and deactivation of the short-circuit switching circuit can then be controlled by the evaluation logic. The predetermined phase voltage threshold value may be adjustable depending on the operating situation. For this purpose, the evaluation logic can be provided, which is designed such that the predetermined phase voltage threshold value can be adjusted, for example in such a way that the predetermined phase voltage threshold value is always below a maximum allowable voltage strength of the power switch.

Electric machines with a plurality of phase windings can be provided such that the evaluation logic in several phases in operation, in particular in all operating phases of the electric machine, detects the respective phase voltages occurring and, in case one of these phase voltages is exceeded, connects one or several ones of the power switches of the inverter bridge associated with the respective phase such that the respective phase current is short-circuited.

The evaluation logic furthermore may include a hysteresis logic which is designed such that activation and deactivation of the short-circuit switching circuit take place at different phase voltages. For example, the hysteresis logic can ensure that the short-circuit switching circuit short-circuits the phase current associated with the power switch only when the phase voltage detected by the phase voltage detecting device reaches or exceeds a predetermined first phase voltage threshold value. Furthermore, the hysteresis logic can ensure that the short-circuit switching circuit terminates the short-circuit state again only when the phase voltage detected by the phase voltage detecting device reaches or falls below a predetermined second phase voltage threshold, which is below the first phase voltage threshold value.

The short-circuit switching circuit may comprise its own power supply which is independent of the power supply of the power electronics unit. As a result, operation of the overvoltage protection device can be ensured independently of a malfunction in the power supply of the electric machine. This is particularly important in cases where there is a risk that the rectified EMF of the electric machine (EMF without a phase angle resulting from a current in the winding) is present after failure of the power supply. Possible examples of such own power supplies are: energy storage elements buffered by the supply network, such as batteries, capacitors, ultra-caps; energy storage elements buffered by the induced voltage of the electric machine; supply of the short-circuit switching circuit directly by induced voltage of the electric machine.

In case of a multi-phase configuration of electric machine and overvoltage protection device, it is favorable to form the short-circuit switching circuit in such a manner that it is in data exchange communication with the short-circuit switching circuit or circuits of other phases in operation, in particular all other phases in operation. In this way, a certain redundancy of the phase voltage detecting device can be achieved, which can be used for a more accurate detection of the phase voltages, e.g., by evaluating all phase voltages in cases where all phase voltages are identical. Also, the failure of one phase voltage detecting device can be detected by the other phase voltage detecting devices.

According to a further aspect, there is proposed a method of driving a permanent magnet machine including a rotor and a stator having at least one stator winding. The method comprises the following steps: driving the stator winding by means of a power switch; detecting a phase voltage applied to the power switch, and short-circuiting the stator winding associated with the power switch when the phase voltage detected reaches or exceeds a predetermined phase voltage threshold value, in order to limit the phase voltage applied to the power switch. It is proposed that the short-circuiting takes place by switching the power switch to a conducting state.

Switching of the power switch to a conducting state can take place in non-clocked manner. Upon activation by switching to a conducting state, the power switch, in case a phase voltage reaches or exceeds the threshold voltage, is kept in the conducting state until the overvoltage condition can be regarded as finished.

In certain embodiments, it may be provided that the switching of the power switch to a conducting state takes place only when the speed of the rotor reaches or exceeds a predetermined minimum speed. This minimum speed may be, for example, 1000 $min^{-1}$, in particular 1500 $min^{-1}$, especially 2000 $min^{-1}$, as indicated above.

In other embodiments, it may be provided that the power switch is switched to a conducting state only when the electric machine operates in a field weakening mode.

BRIEF DESCRIPTION OF THE SEVERAL VIEWS OF THE DRAWINGS

The invention will be explained in more detail in the following with reference to preferred embodiments which are illustrated in the figures in which.

DETAILED DESCRIPTION

Figure 1:
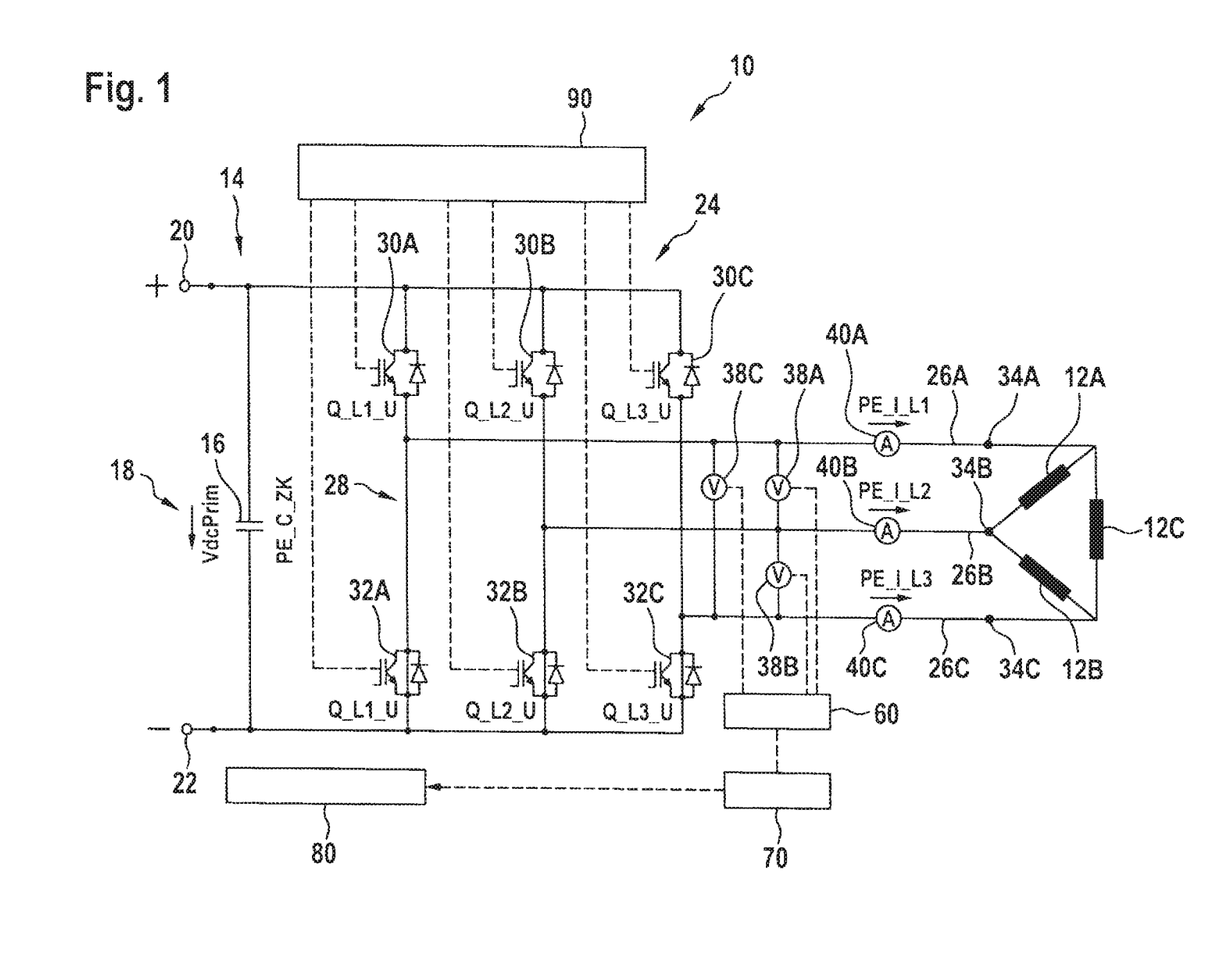
FIG. 1 shows a schematic and simplified view of a circuit diagram of a portion of a power electronics unit for driving a permanent magnet electric machine in delta connection configuration comprising power switches for driving stator windings and an overvoltage protection device, according to an embodiment.

FIG. 1 shows, in schematic and simplified manner, a circuit diagram of a portion of a power electronics unit 10 for driving a permanent magnet electric machine in delta connection configuration. The electric machine comprises a stator with stator windings 12A, 12B, 12C and a rotor carrying permanent magnets (not shown in FIG. 1). In FIG. 1, only the three stator windings 12A, 12B, 12C are illustrated schematically. The power electronics unit 10 has a DC voltage intermediate circuit 14 with a capacitor 16 indicated on the left side in FIG. 1. The DC voltage intermediate circuit 14 supplies an intermediate circuit voltage VdcPrim (denoted by 18 in FIG. 1) between a positive pole 20 (indicated as a positive potential rail or bus) and a negative pole 22 (indicated as a negative potential rail or bus). The DC voltage intermediate circuit 14 feeds an inverter 24 having the stator windings 12A, 12B, 12C connected to the outputs 26A, 26B, 26C of the same. The inverter 24 comprises a three-phase inverter bridge 28 having three pairs of power switches 30A, 32A, 30B, 32B, 30C, 32C. The first pair of power switches is associated with a first stator winding 12A and includes a first power switch 30A connected to the positive pole 20 and a second power switch 32A connected to the negative pole 22. The second pair of power switches is associated with a second stator winding 12B and also includes a first power switch 30B connected to the pole 20 and a second power switch 32b connected to the negative pole 22. The third pair of power switches is associated with a third stator winding 12C and also includes a first power switch 30C connected to the positive pole 20 and a second power switch 32C connected to the negative pole 22. In the following, the power switches 30A, 30B, 30C connected to the positive pole 20 will be generally referred to as "upper power switches" and the power switches 32A, 32B, 32C connected to the negative pole 22 will be generally referred to as "lower power switches." The power switches 30A, 32A, 30B, 32B, 30C, 32C serve to drive the stator windings 12A, 12B, 12C and, from the DC voltage supplied from the DC voltage intermediate circuit 14, generate a stator rotary field for driving the rotor in the motor operating mode of the electric machine. In the operating mode of the electric machine as generator, the power switches 30A, 32A, 30B, 32B, 30C, 32C provide for feeding an electric current induced in the stator windings 12A, 12B, 12C by rotation of the rotor into the DC voltage intermediate circuit 14.

Each of the power switches may include an active electrical switching element. In particular, the power switches 30A, 32A, 30B, 32B, 30C, 32C may be implemented as field effect transistors (FETs), as indicated by the circuit symbols used. In particular, metal oxide field effect transistors (MOSFETs) can be used as power switches. As an alternative, it is also possible to use other switching elements used in power electronics systems, such as insulated gate bipolar transistors (IGBTs). Each of the power switches 30A, 32A, 30B, 32B, 30C, 32C comprises furthermore a freewheeling diode connected in parallel with the respective switching element (MOSFET, IGBT, or the like). The freewheeling diode has such a polarity that it is blocking with respect to the voltage at the respectively associated pole 20, 22 of the intermediate circuit 14. Thus, in the generator mode of operation of the electric machine, a current generated in the stator windings 12A, 12B, 12C can be passed via a respective freewheeling diode into the intermediate circuit 14.

In the motor mode of operation, the respective power switches 30A, 32A, 30B, 32B, 30C, 32C are switched between blocking (or open) and conducting (or closed) such that a rotating field driving the rotor is generated at the respectively associated stator windings 12A, 12B, 12C. This can be effected, for example, by suitable pulse width modulation of the on/off voltage signals supplied by the power switches 30A, 32A, 30B, 32B, 30C, 32C to the respective stator winding 12A, 12B, 12C.

FIG. 1 shows a configuration with an electric machine in delta connection configuration, i.e., the three stator windings 12A, 12B, 12C are connected in series and, between two successive stator windings each, there is provided a terminal 34A, 34B, 34C having a respectively associated output 26A, 26B, 26C of the inverter 24 connected thereto. Between two outputs 26A/26B, 26B/26C, 26C/26A each of the inverter 24, there is thus always exactly one stator winding 12A, 12B, 12C.

The voltage between two outputs 26A/26B, 26B/26C, 26C/26A each of the inverter 24 is detected by a respective phase voltage detecting device 38A, 38B, 38C. Each of the phase voltage detecting device 38A, 38B, 38C thus detects the voltage between the ends of a respectively associated stator winding 12A, 12B, 12C. In addition, each of the outputs 26A, 26B, 26C of the inverter 24 has a respective phase current detecting device 40A, 40B, 40C associated therewith, which detects the phase current supplied to a respective stator winding 12A, 12B, 12C and discharged from the respective stator winding 12A, 2B, 12C, respectively. It should be noted that the phase current detecting device 40A, 40B, 40C are not necessarily required in any case with respect to the function of the overvoltage protection device described herein.

The signals supplied by the phase voltage detecting device 38A, 38B, 38C as well as the signals supplied by the phase current detecting device 40A, 40B, 40C are supplied to an evaluation unit 60 and evaluated there. The evaluation unit 60 is in data communication with a system controller 80 of the electric machine. Between the evaluation unit 60 and the system controller 80, there is connected furthermore a hysteresis logic 70, the function of which will be explained in more detail with reference to FIG. 3.

The power switches 30A, 32A, 30B, 32B, 30C, 32C are connected to a switch controller 90 controlling the power switches 30A, 32A, 30B, 32B, 30C, 32C. In the examples illustrated, the switch controller 90 provides for controlling of the gates of the field effect transistors to switch them between a blocking state (the power switch is open) and a conducting state (the power switch is closed). The controller 90 also provides for an independent power supply of the power switches 30A, 32A, 30B, 32B, 30C, 32C, so that they can still be driven even in case of failure of the control system of the electric machine.

The electric machine comprises furthermore a speed detecting device (not shown in FIG. 1) for detecting the rotational speed of the electric machine. The speed detection can be effected, for example, by means of a suitable speed sensor. As an alternative, it is also possible to use suitable signals in one or several ones of the stator windings for speed detection, so that a specially provided speed sensor is not required.

When one of the phase voltage detecting devices 38A, 38B, 38C detects a phase voltage that is above a maximum voltage allowed for the associated electronic components, in particular a maximum voltage allowed for the associated power switches 30A, 32A, 30B, 32B, 30C, 32C, the evaluation unit 60 causes the switch controller 92 to drive the respectively associated power switches 30A, 32A, 30B, 32B, 30C, 32C such that the respectively associated stator winding 12A, 12B, 12C is short-circuited. For example, when the phase voltage detecting device 38A associated with the first stator winding 12A detects an inadmissibly high phase voltage, it causes the power switches 30A and 30B to be switched to a closed state to create a short-circuit system in which a short-circuit current flows through the stator winding 12A, across the two power switches 30A and 30B. In this manner, it is possible to reliably prevent damage to the power switches 30A, 30B due to overvoltage, as it may occur especially when the electric machine is operated in the field weakening mode. Of course, it is readily possible to close, instead of the power switches 30A and 30B associated with the positive pole 20, the corresponding power switches 32A and 32B associated with the negative pole 22, so that the short-circuit current through the first stator winding 12A then is passed across these two closed power switches 32A and 32B and across the negative pole 20.

The same applies analogously when one of the other phase voltage detecting devices 38B, 38C detects a voltage above the maximum phase voltage permissible for the respectively associated power switches. The phase voltage detecting devices 38A, 38B, 38C may each operate separately to prevent overvoltage at the respectively associated power switches. This can indeed be done at the same time, or with time offset. It is also conceivable that the phase voltage detection devices 38A, 38B, 38C are in data exchange communication with each other, so that the activation of the overvoltage protection devices for all the stator windings 12A, 12B, 12C can be effected in coordinated manner, for example, such that all stator windings are short-circuited when only one of the overvoltage protection devices 38A, 38B, 38C detects an overvoltage, or that activation of the overvoltage protection device is effected on the basis of an average value of the phase voltages detected by the phase voltage detecting devices 38A, 38B, 38C.

The switch controller 90 does not necessarily have to be designed as a separate unit, but may also be integrated in the system controller 80, possibly along with the evaluation unit 60 and/or the hysteresis logic 70. However, it is advantageous when at least the driving and power supply of the power switches 30A, 32A, 30B, 32B, 30C, 32C and the phase voltage detecting device 38A, 38B, 38C are designed separately from the remainder of the control system and power supply of the electric machine in so far as a detection of overvoltage and a corresponding control of the power switches 30A, 32A, 30B, 32B, 30C, 32C are possible independently of the functional state of the other components of the electric machine. The overvoltage protection device then can still be activated when there is a fault present in other components or units of the electric machine.

It follows from the above that the evaluation unit 60 as well as the hysteresis logic 70 provided in FIG. 1 indeed offer certain advantages, but are not absolutely necessary for the function of the overvoltage protection device illustrated here.

Figure 2:
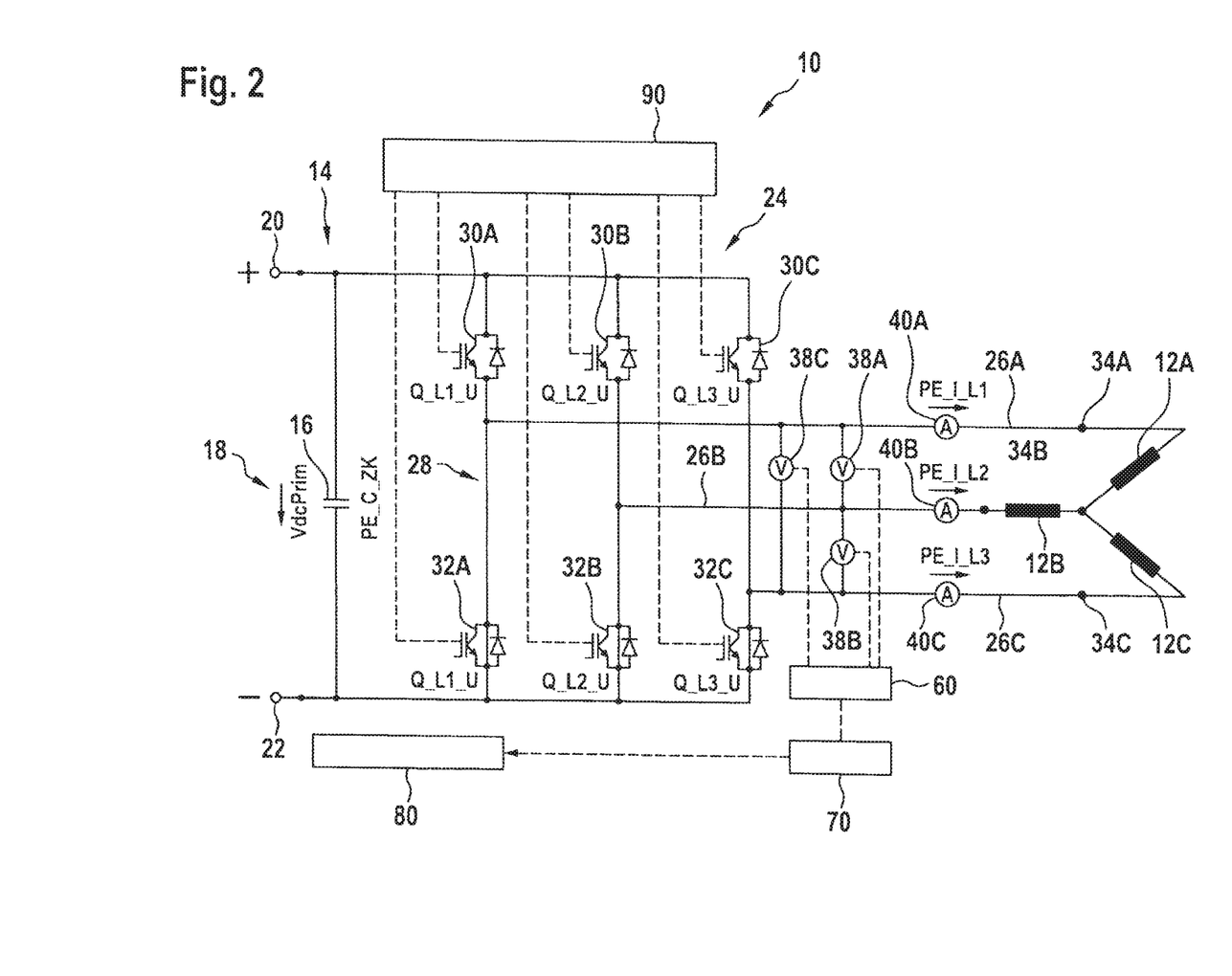
FIG. 2 shows a schematic and simplified view of a circuit diagram of a portion of a power electronics unit for driving a permanent magnet electric machine in star connection configuration comprising power switches for driving stator windings and an overvoltage protection device for protection of the power switch against overvoltage, according to an embodiment.

FIG. 2 shows a schematic and simplified illustration, corresponding to FIG. 1, of a circuit diagram of a part of a power electronics unit 10 for driving an electric machine in star connection, which is excited by permanent magnets, comprising power switches 30A, 32A, 30B, 32B, 30C, 32C for driving stator windings 12A, 12B, 12C. The power electronics unit 10 according to FIG. 2 has the same overvoltage protection device for protecting the power switches 30A, 32A, 30B, 32B, 30C, 32C from overvoltage as shown in FIG. 1. The sole difference between FIG. 1 and FIG. 2 is that FIG. 2 shows the situation in case of an electric machine arranged in star connection configuration. Therefore, all components in FIG. 2 are designated with the same numerals as in FIG. 1, and for avoiding repetitions, reference may be made to the corresponding description of FIG. 1.

In the configuration illustrated in FIG. 2, showing an electric machine in star connection configuration, the three stator windings 12A, 12B, 12C are each star connected between a common reference point and a terminal 34A, 34B, 34C, which has a respectively associated output 26A, 26B, 26C of the inverter 24 connected thereto. Between two terminals 34A, 34B, 34C each, there are thus provided two stator windings 12A, 12B, 12C connected in series therewith.

Here too, the voltage between two outputs 26A/26B, 26B/26C, 26C/26A each is detected by a respective phase voltage detecting device 38A, 38B, 38C. Thus, each of the phase voltage detecting devices detects the voltage between the ends of two successive associated stator windings each (namely, the voltage between the ends of the stator windings 12A and 12B in case of the phase voltage detecting devices 38A, the voltage between the ends of the stator windings 12B and 12C in case of the phase voltage detecting device 38B, and the voltage between the ends of stator windings 12C and 12A in case of the phase voltage detecting device 38C).

As for the rest, the same applies with respect to the operation of the overvoltage protection device in star connection according to FIG. 2 as for the configuration shown in FIG. 1, and reference is made to the corresponding explanations regarding FIG. 1.

Figure 3:
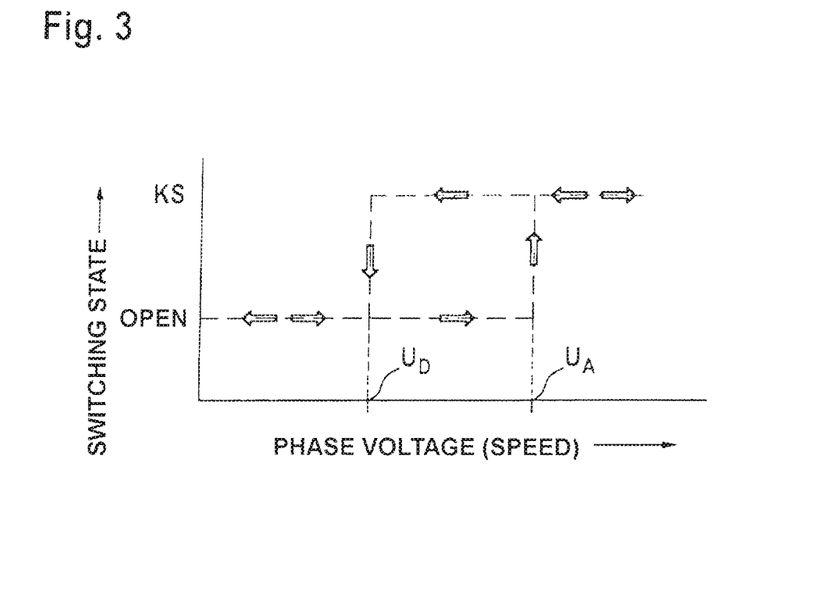
FIG. 3 shows a diagram for illustrating the hysteresis between activation and deactivation of the overvoltage protection device.

FIG. 3 shows a diagram for illustrating the hysteresis between activation and deactivation of the overvoltage protection device. Such a hysteresis can be set, for example, by means of the hysteresis logic 70. As shown in FIG. 3, the overvoltage protection device remains inactive (and thus the respectively corresponding ones of the power switches 30A, 32A, 30B, 32B, 32A, 32B are activated in the regular function as inverter power switches of the inverter 24) as long as a respective phase voltage detecting device 38A, 38B, 38C detects a voltage below an activation threshold voltage $V_A$. When the activation threshold voltage $U_A$ is reached or even exceeded, the overvoltage protection device is activated and thus the corresponding ones of the power switches 30A, 32A, 30B, 32B, 32A, 32B are switched to a closed switching state (indicated by "KS" in FIG. 3). In this switching state, a short-circuit current can flow through the associated stator winding 12A, 12B, 12C. The switching state "KS" is maintained until the phase voltage detected by the respective phase voltage detecting device 38A has dropped to a deactivating threshold voltage $V_D$ which is smaller than the activating threshold voltage $V_A$. Reaching of the deactivating threshold voltage $V_D$ can be ascertained indirectly, for example, in the short-circuited state of the power switches, for example, by way of the speed.

Figure 4:
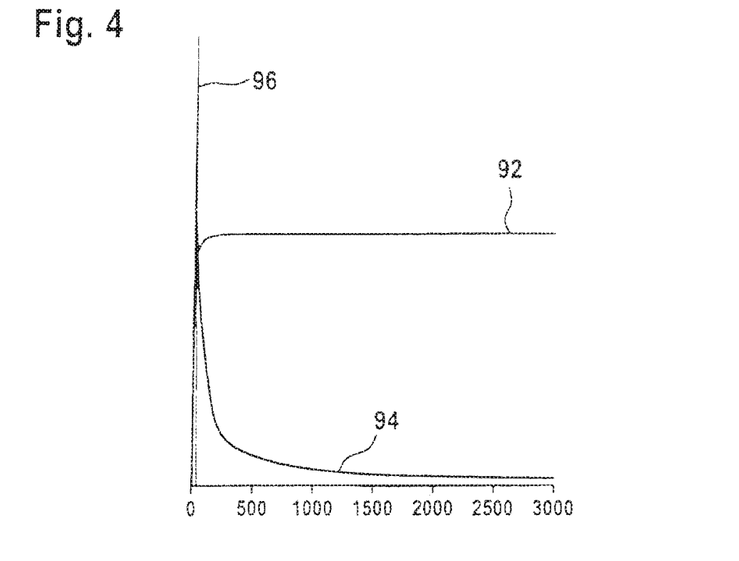
FIG. 4 shows a diagram illustrating the course of the short-circuit current generated upon activation of the overvoltage protection device in a phase winding of the stator, the associated torque and the short-circuit power as a function of the speed of the rotor.

In the diagram according to FIG. 4, reference numeral 92 designates the course of the short-circuit current in a phase winding 12A, 12B, 12C of the stator, which is generated upon activation of the overvoltage protection device, reference numeral 94 designates the torque in connection therewith, and reference numeral 96 designates the short-circuit power generated upon activation of the overvoltage protection device as a function of the speed of the rotor. It can be seen that the short-circuit current exerts a noticeable torque on the rotor only at very low rotational speeds and that the short-circuit power generated virtually is no longer of relevance already at speeds from 100 revolutions per minute. This means that the activation of the overvoltage protection device produces merely a negligible braking effect on the movement of the rotor when activation takes place at high speeds, in particular at speeds of 1000 revolutions per minute or more.

The invention claimed is:

1. A power electronics unit for driving a permanent magnet electric machine including a rotor and a stator having at least one stator winding, comprising:
   at least one power switch configured to drive the at least one stator winding, and
   an overvoltage protection device to protect the at least one power switch from overvoltage,
   wherein the overvoltage protection device comprises a phase voltage detecting device associated with the at least one power switch as well as a short-circuit switching circuit which, when a predetermined phase voltage threshold value of the phase voltage detected by the phase voltage detection device is reached or exceeded, is adapted to be activated for short-circuiting the at least one stator winding associated with the at least one power switch, and
   wherein the short-circuit switching circuit comprises the at least one power switch configured to drive the at least one stator winding,
   wherein the short-circuit switching circuit comprises an evaluation logic for driving the short-circuit switching circuit, wherein the evaluation logic is designed such that the predetermined phase voltage threshold value is adjustable.

2. The power electronics unit of claim 1, wherein the at least one power switch forms a short-circuit switching element of the short-circuit switching circuit that is associated with the at least one stator winding, and wherein the short-circuit switching circuit is configured to switch the at least one power switch to a conducting state in order to short-circuit the at least one stator winding associated with the at least one power switch.

3. The power electronics unit of claim 1, wherein the at least one power switch is formed as a switching element of an inverter bridge configured to drive the at least one stator winding.

4. The power electronics unit of claim 1, comprising at least a three-phase inverter bridge configured to drive the stator provided with at least three stator windings.

5. The power electronics unit of claim 1, comprising a DC voltage intermediate circuit having a first pole and a second pole, an input of the at least one power switch being connected to one of the first and second poles of the DC voltage intermediate circuit.

6. The power electronics unit claim 1, wherein the short-circuit switching circuit is configured to keep the power switch in a conducting state after activation to generate a short-circuit of the associated stator winding, until deactivation of the short-circuit switching circuit.

7. The power electronics unit of claim 1, wherein the short-circuit switching circuit is configured to switch the at least one power switch to a conducting state to generate a short-circuit of the associated stator winding only when a speed of the rotor reaches or exceeds a predetermined minimum speed.

8. The power electronics unit of claim 7, wherein the predetermined minimum speed is 500 min$^{-1}$.

9. The power electronics unit claim 1, wherein the short-circuit switching circuit is configured to switch the at least one power switch to a conducting state to generate a short-circuit of the associated stator winding only when the electric machine is operating in a field weakening mode.

10. The power electronics unit of claim 1, wherein the evaluation logic is configured to detect the phase voltages of all phases of the electric machine and, in the event one of the phase voltages is exceeded, switches one or more of the power switches associated with the respective phase to a conducting state, so that the respective stator winding is short-circuited.

11. The power electronics unit of claim 1, wherein the evaluation logic has a hysteresis logic associated therewith which is designed such that activation and deactivation of the short-circuit switching circuit take place at different phase voltages.

12. The power electronics unit of claim 1, wherein the short-circuit switching circuit has a power supply of its own associated therewith, which is independent of the power supply of the power electronics unit.

13. The power electronics unit of claim 12, wherein the at least one power switch forms a short-circuit switching element of the short-circuit switching circuit that is associated with the at least one stator winding, and wherein the short-circuit switching circuit is configured to switch the at least one power switch to a conducting state in order to short-circuit the stator winding associated with the power switch.

14. The power electronics unit of claim 12, wherein the at least one power switch is formed as a switching element of an inverter bridge configured to drive the at least one stator winding.

15. The power electronics unit of claim 1, wherein the short-circuit switching circuit is configured to be in data exchange communication with the short-circuit switching circuit of other phases in operation.

16. A method of driving an electric machine excited by permanent magnets and including a rotor and a stator having at least one stator winding, said method comprising:
  driving the at least one stator winding using a power switch,
  detecting a phase voltage applied to the power switch, and
  using a short-circuit switching circuit, short-circuiting the at least one stator winding associated with the power switch when the detected phase voltage reaches or exceeds a predetermined phase voltage threshold value in order to limit the phase voltage applied to the power switch,
  wherein short-circuiting is performed by switching the power switch to a conducting state, wherein the short-circuit switching circuit comprises an evaluation logic for driving the short-circuit switching circuit, wherein the evaluation logic is designed such that the predetermined phase voltage threshold value is adjustable.

17. The method of claim 16, wherein switching the power switch takes place in a non-clocked manner.

18. The method of claim 16, wherein switching the power switch takes place only when the speed of the rotor reaches or exceeds a predetermined minimum speed.

19. The method of claim 18, wherein the predetermined minimum speed is 500 min$^{-1}$.

20. The method of claim 16, wherein the power switch is switched only when the electric machine is operating in a field weakening mode.

* * * * *